Figure 1:
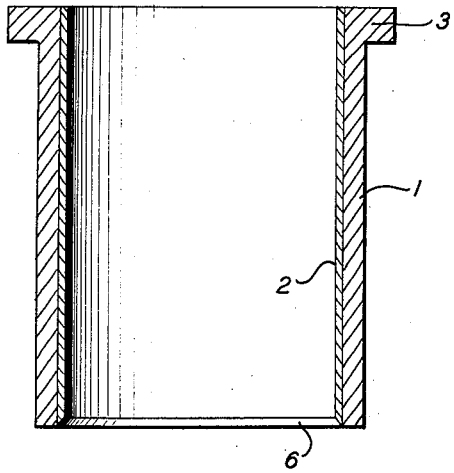

Jan. 15, 1963  E. STUMP  3,073,290
CYLINDER LINER CONSTRUCTION PARTICULARLY FOR
INTERNAL COMBUSTION ENGINES
Filed July 1, 1959

INVENTOR
EUGEN STUMP

BY Dickes, Craig and Freudenberg
ATTORNEYS

United States Patent Office 3,073,290
Patented Jan. 15, 1963

3,073,290
CYLINDER LINER CONSTRUCTION PARTICULARLY FOR INTERNAL COMBUSTION ENGINES
Eugen Stump, Stuttgart-Unterturkheim, Germany, assignor to Daimler-Benz Aktiengesellschaft, Stuttgart-Unterturkheim, Germany
Filed July 1, 1959, Ser. No. 824,404
Claims priority, application Germany July 3, 1958
3 Claims. (Cl. 123—41.69)

The present invention relates to a further development and improvement of cylinder liners or sleeves used particularly in connection with internal combustion engines.

The present invention essentially consists of a steel sleeve or liner provided on the inside thereof with a layer of centrifugally cast iron forming the sliding or guiding surface for the piston.

The combination of materials of steel and cast iron in accordance with the present invention for the sleeve and sliding surface of the liner not only excels by offering the advantage of a liner produced thereby which has the high strength of a steel liner and the excellent running and wear-resistant qualities of a centrifugally cast liner; for additionally, and of particular significance, a cylinder liner constructed according to the present invention, expands less under the influence of the operating temperature of the engine, and cavitation, in case of wet liners, is reduced to a minimum due to the smaller pulsating movements in a radial direction of the liner wall set-up by the pressure within the liner.

Moreover, a more homogeneous piston-sliding or running surface is obtained thereby which is capable of better retaining thereon the lubricant. As a result of such an improved oil-retaining surface, smaller piston clearances are required, a feature which in turn results in a correspondingly smaller lubricating oil consumption. Furthermore, greater insensitivity at the liner flange is obtained with respect to the pressures which occur thereat during assembly and under normal operation. Finally, the total wall thickness of the liner may be made comparatively smaller than that of conventional liners which, in turn, results in the possibility of a corresponding reduction of the overall length of a multi-cylinder engine.

The present invention is also equally applicable to air-cooled internal combustion engines. In that case, the cooling ribs, made especially of aluminum, are cast, for instance, according to the so-called Alfin-Process, which uses an intermediate layer that is melted under the temperature prevailing during casting, or are suitably pressed or shrunk onto the cylinder liner in very well known manner.

In the case of a screw-thread connection between the liner and the cylinder block or the cylinder head, a reliable threaded engagement is obtained even at relatively higher temperatures as a result of the larger modulus of elasticity of the steel and, at the same time, an increased margin of safety of the entire cylinder against the occurring combustion pressures is assured thereby.

Accordingly, it is an object of the present invention to provide a cylinder liner having relatively superior wear and operating characteristics which includes a steel sleeve and is provided on the inside thereof with a layer of centrifugally cast iron.

It is another object of the present invention to provide a cylinder liner particularly used for internal combustion engines, which has the strength of a steel liner and the wear-resistant quality of a centrifugally cast iron liner.

It is another object of the present invention to provide a cylinder liner which expands a minimum amount under the effect of the operating temperatures and, in which, in case of wet liners, cavitation is reduced.

A still further object of the present invention resides in the provision of a cylinder liner which has a homogeneous piston-sliding surface and, at the same time, renders possible a retention thereon of a relatively much larger amount of lubricating oil.

Still another object of the present invention resides in the provision of a cylinder liner for internal combustion engines which requires minimum piston clearance and consequently a minimum of lubricating oil for satisfactory operation thereof.

A still further object of the present invention resides in the provision of a cylinder liner in which the combined wall thickness thereof may be made relatively thin which in turn results in a shorter engine when a number of cylinders are employed.

Figure 2:
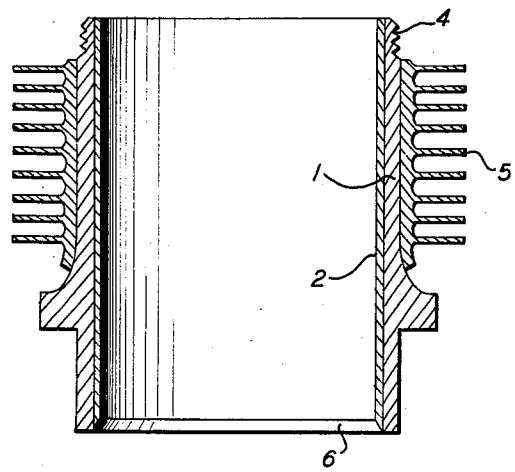

These and other objects, features and advantages of the present invention will become more obvious from the following description when taken in connection with the accompanying drawing which shows in the two views thereof, for purposes of illustration only, two embodiments in accordance with the present invention, and wherein:

FIGURE 1 is a schematic longitudinal cross-sectional view through a wet type cylinder liner according to the present invention held in position by a flange provided thereon, and FIGURE 2 is a schematic longitudinal cross-sectional view through an air-cooled cylinder liner according to the present invention, provided with a screw thread for connection with the cylinder head.

Referring now to the drawing, wherein like reference numerals are used throughout the two views thereof to designate like parts, reference numeral 1 represents the steel sleeve or liner while reference numeral 2 designates the centrifugally-cast sliding surface disposed along the inside of the liner 1. The flange for holding the liner 1, 2 in place is designated by reference numeral 3 in FIGURE 1.

In the embodiment of FIGURE 2, the thread providing a threaded connection between the cylinder head (not shown) and the liner 1 is designated therein by reference numeral 4. Moreover, reference numeral 5 designates in FIGURE 2 the cooling ribs put on or emplaced over the liner 1.

In both embodiments of FIGURES 1 and 2, the centrifugally-cast sliding surface 2 is slightly chamfered as at 6 along the lower edge of the cylinder liner 2.

The centrifugally-cast layer 2 may be made about 1 to 3 millimeters thick. The thickness of the steel sleeve 1 depends essentially on the power output required of the cylinder, however, this thickness may be kept correspondingly thinner under consideration of the thickness of the centrifugally-cast layer of cast iron and of the clamping or gripping action of the cooling ribs.

While I have shown and described two embodiments in accordance with the present invention, it is understood that the same is not limited thereto but is susceptible of many changes and modifications within the spirit and scope of the present invention, and I, therefore, do not wish to be limited to the details shown and described herein, but intend to cover all such changes and modifications as are encompassed by the scope of the appended claims.

I claim:

1. A cylinder liner construction adapted to have reciprocating therein a piston, particularly for an internal combustion engine, having improved wearability and sliding characteristics, comprising a steel sleeve, a layer of centrifugally-cast cast iron on the inside of said sleeve serving as the sliding surface for said piston, the thickness of said layer of cast iron being less than 3 millimeters, and cooling means including a casing surrounding said steel sleeve on the outside thereof and cooling ribs rigidly secured to said casing extending outwardly therefrom, said ribs and casing being made of a light metal selected from the group consisting of aluminum, magnesium and alloys thereof.

2. A cylinder liner construction adapted to have reciprocatnig therein a piston, particularly for an internal combustion engine, having improved wearability and sliding characteristics, consisting of a steel sleeve, a layer of centrifugally-cast cast iron on the inside of said sleeve serving as the sliding surface for said piston, the thickness of said layer of cast iron being less than 3 millimeters, and cooling means for said sleeve comprising a casing surrounding said steel sleeve on the outside thereof and having cooling ribs extending outwardly therefrom, said cooling means being made of a light metal.

3. A cylinder liner construction adapted to have reciprocating therein a piston, particularly for an internal combustion engine, having improved wearability and sliding characteristics, consisting of a steel sleeve, a layer of centrifugally-cast cast iron on the inside thereof serving as the sliding surface for said piston, the thickness of said layer of cast iron being less than 3 millimeters and cooling means for said sleeve comprising a casing surrounding said steel sleeve on the outside thereof, and having cooling ribs extending outwardly therefrom, said cooling means being made of a light metal selected from the group consisting of aluminum, magnesuim and alloys thereof.

References Cited in the file of this patent

UNITED STATES PATENTS

| | | |
|---|---|---|
| 1,775,358 | Smith | Sept. 9, 1930 |
| 1,828,335 | Millspaugh | Oct. 20, 1931 |
| 1,886,396 | Hainlen | Nov. 8, 1932 |
| 1,917,872 | Campbell | July 11, 1933 |
| 1,927,305 | Campbell | Sept. 19, 1933 |
| 1,943,720 | Campbell | Jan. 16, 1934 |
| 2,046,914 | Kormann et al. | July 7, 1936 |
| 2,109,110 | Frank | Feb. 2, 1938 |
| 2,176,773 | Sparkes | Oct. 17, 1939 |
| 2,320,830 | Ricardo et al. | June 1, 1943 |
| 2,393,036 | Farr | Jan. 15, 1946 |
| 2,400,495 | Ford et al. | May 21, 1946 |
| 2,462,139 | Sparkes | Feb. 22, 1949 |
| 2,656,593 | Heintz | Oct. 27, 1953 |
| 2,840,195 | Holton | June 24, 1958 |

FOREIGN PATENTS

| | | |
|---|---|---|
| 321,258 | Switzerland | Apr. 30, 1957 |